US012770622B2

(12) United States Patent
Beck et al.

(10) Patent No.: US 12,770,622 B2
(45) Date of Patent: Oct. 20, 2026

(54) DIALECT CORRECTION AND TRAINING

(71) Applicant: Lenovo (Singapore) Pte. Ltd., Singapore (SG)

(72) Inventors: Kevin W. Beck, Raleigh, NC (US); Russell S. VanBlon, Raleigh, NC (US); Thorsten Stremlau, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 162 days.

(21) Appl. No.: 18/923,565

(22) Filed: Oct. 22, 2024

(65) Prior Publication Data

US 2025/0046311 A1 Feb. 6, 2025

Related U.S. Application Data

(63) Continuation-in-part of application No. 17/201,800, filed on Mar. 15, 2021, now abandoned.

(51) Int. Cl.

| | |
|---|---|
| ***G10L 15/22*** | (2006.01) |
| ***G10L 15/06*** | (2013.01) |
| ***G10L 15/18*** | (2013.01) |

(52) U.S. Cl.

CPC ............ *G10L 15/22* (2013.01); *G10L 15/063* (2013.01); *G10L 15/18* (2013.01); *G10L 2015/0638* (2013.01); *G10L 2015/225* (2013.01)

(58) Field of Classification Search

CPC ....... G10L 15/22; G10L 15/063; G10L 15/18; G10L 2015/0638; G10L 2015/225; G10L 15/005; G09B 19/06; G06F 40/232; G06F 40/263

USPC ........................................................ 704/231

See application file for complete search history.

(56) References Cited

U.S. PATENT DOCUMENTS

| | | | | | |
|---|---|---|---|---|---|
| 5,987,403 | A | | 11/1999 | Sugimura | |
| 6,069,939 | A | * | 5/2000 | Fung | H04M 3/4228 379/88.05 |
| 6,598,021 | B1 | * | 7/2003 | Shambaugh | G10L 15/005 704/E15.003 |
| 7,941,481 | B1 | * | 5/2011 | Partovi | G06Q 30/02 709/219 |
| 8,195,457 | B1 | * | 6/2012 | Lagassey | G10L 19/0018 704/235 |

(Continued)

*Primary Examiner* — Thuykhanh Le

(74) *Attorney, Agent, or Firm* — Kunzler Needham Hilton

(57) ABSTRACT

For displaying proactive training, a method monitors user communications between electronic devices. The method trains a dialect database on dialects in a user language. The dialect database is trained to identify speech, pronunciations, stresses, accents, gestures, metaphors, and spellings associated with each dialect. The method anticipates communications to take place in the user communications based on a scheduled call. The method modifies a proactive training based on the anticipated user communications for modifying the user dialect to the second dialect based on the dialect correction. The method displays the proactive training on screens of the electronic devices during the user communications in response to the communication difference between the user dialect and the second dialect, wherein the proactive training displays a word and a first meaning in the user dialect and the word and a second meaning in the second dialect.

20 Claims, 8 Drawing Sheets

(56) References Cited

U.S. PATENT DOCUMENTS

| | | | | |
|---|---|---|---|---|
| 8,635,068 | B2 * | 1/2014 | Pulz | G10L 15/19 704/8 |
| 9,437,191 | B1 * | 9/2016 | Chen | G10L 15/22 |
| 9,697,824 | B1 * | 7/2017 | Chen | G01C 21/3608 |
| 9,916,307 | B1 * | 3/2018 | Kochura | G06F 40/247 |
| 10,055,401 | B2 * | 8/2018 | Kochura | G06F 40/30 |
| 2005/0286705 | A1 * | 12/2005 | Contolini | H04M 3/5232 379/88.02 |
| 2007/0208569 | A1 * | 9/2007 | Subramanian | G10L 19/0018 704/E19.007 |
| 2008/0070697 | A1 * | 3/2008 | Robinson | A63F 13/30 463/42 |
| 2008/0147408 | A1 | 6/2008 | Da Palma et al. | |
| 2008/0228480 | A1 * | 9/2008 | Maegawa | G10L 15/07 704/E15.047 |
| 2009/0070102 | A1 * | 3/2009 | Maegawa | G10L 15/183 704/277 |
| 2009/0217196 | A1 * | 8/2009 | Neff | G06Q 10/10 715/799 |
| 2009/0222742 | A1 * | 9/2009 | Pelton | G06Q 10/10 715/753 |
| 2012/0016848 | A1 * | 1/2012 | Tofano | G06F 16/215 707/694 |
| 2012/0215520 | A1 * | 8/2012 | Davis | G06F 40/58 704/3 |
| 2013/0030789 | A1 * | 1/2013 | Dalce | G10L 15/26 704/2 |
| 2013/0124188 | A1 * | 5/2013 | Li | G06F 3/0237 704/8 |
| 2013/0246072 | A1 * | 9/2013 | Duffield | G06F 3/167 704/275 |
| 2014/0100848 | A1 | 4/2014 | Shaffer et al. | |
| 2014/0163948 | A1 * | 6/2014 | Daly | G06F 40/58 704/2 |
| 2014/0236695 | A1 * | 8/2014 | Shvarts | G06Q 30/0224 705/14.25 |
| 2014/0343936 | A1 * | 11/2014 | Thapar | G06Q 10/109 704/235 |
| 2015/0006167 | A1 * | 1/2015 | Kato | G01C 21/3608 704/231 |
| 2015/0046158 | A1 * | 2/2015 | Efrati | G10L 21/003 704/235 |
| 2015/0066805 | A1 * | 3/2015 | Candee | G06Q 30/0282 705/347 |
| 2015/0278201 | A1 | 10/2015 | Prokofyev et al. | |
| 2016/0092438 | A1 * | 3/2016 | Sonoo | G06F 40/58 704/2 |
| 2016/0210959 | A1 * | 7/2016 | Efrati | H04M 3/51 |
| 2016/0224540 | A1 * | 8/2016 | Stewart | G06F 40/232 |
| 2017/0039448 | A1 * | 2/2017 | Ganda | H04N 1/4493 |
| 2017/0193986 | A1 | 7/2017 | Chen | |
| 2017/0238026 | A1 * | 8/2017 | Agrawal | H04N 21/25883 725/14 |
| 2017/0270080 | A1 * | 9/2017 | Sakamoto | G06F 40/106 |
| 2018/0285059 | A1 * | 10/2018 | Zurek | G06F 40/35 |
| 2018/0293228 | A1 | 10/2018 | Tarakji et al. | |
| 2018/0350343 | A1 * | 12/2018 | Knudson | G10L 25/51 |
| 2020/0125644 | A1 * | 4/2020 | Liu | G06F 40/58 |
| 2020/0160836 | A1 * | 5/2020 | Chen | G10L 15/005 |
| 2020/0193971 | A1 * | 6/2020 | Feinauer | G10L 15/075 |
| 2020/0193972 | A1 * | 6/2020 | Feinauer | G06N 20/10 |
| 2020/0211532 | A1 * | 7/2020 | Rule | G10L 25/48 |
| 2020/0213680 | A1 * | 7/2020 | Ingel | H04N 21/8106 |
| 2020/0279018 | A1 * | 9/2020 | Hamashita | G06F 40/58 |
| 2020/0302263 | A1 * | 9/2020 | Douek | G06N 3/006 |
| 2020/0379777 | A1 * | 12/2020 | Christiansen | G06F 8/61 |
| 2021/0027766 | A1 * | 1/2021 | Shi | G10L 15/063 |
| 2021/0035585 | A1 * | 2/2021 | Gupta | G10L 15/26 |
| 2022/0051673 | A1 * | 2/2022 | Ohmura | G06F 40/186 |
| 2022/0385458 | A1 * | 12/2022 | Keith, Jr. | A61B 5/0077 |
| 2023/0223006 | A1 * | 7/2023 | Fan | H04M 1/72433 704/231 |

* cited by examiner

DIALECT CORRECTION AND TRAINING

CROSS-REFERENCE TO RELATED APPLICATIONS

This is a continuation-in-part application of and claims priority to U.S. patent application Ser. No. 17/201,800 entitled "DIALECT CORRECTION AND TRAINING" and filed on Mar. 15, 2021 for Kevin Beck, which is incorporated herein by reference.

BACKGROUND INFORMATION

The subject matter disclosed herein relates to dialects and more particularly relates to dialect correction and training.

BRIEF DESCRIPTION

A method for displaying proactive training is disclosed. The method monitors user communications between electronic devices. The method trains a dialect database on dialects in a user language. The dialect database is trained to identify speech, pronunciations, stresses, accents, gestures, metaphors, and spellings associated with each dialect. The method identifies a user language and a user dialect from the user communications using the dialect database that identifies dialects and translates equivalent communications between dialects. The method compares the user dialect to a second dialect using the dialect database in a scheduled communication. The method identifies a mixed dialect event in response to the user dialect and the second dialect being different. The method identifies a plurality of corresponding different meanings, pronunciations, stresses, spellings, and accents in the second dialect. The method determines a dialect correction using the dialect database in response to the communication difference between the user dialect and the second dialect, wherein the dialect correction highlights the communication differences. The method anticipates communications to take place in the user communications based on a scheduled call. The method modifies a proactive training based on the anticipated user communications for modifying the user dialect to the second dialect based on the dialect correction. The method displays the proactive training on screens of the electronic devices during the user communications in response to the communication difference between the user dialect and the second dialect, wherein the proactive training displays a word and a first meaning in the user dialect and the word and a second meaning in the second dialect.

BRIEF DESCRIPTION OF DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
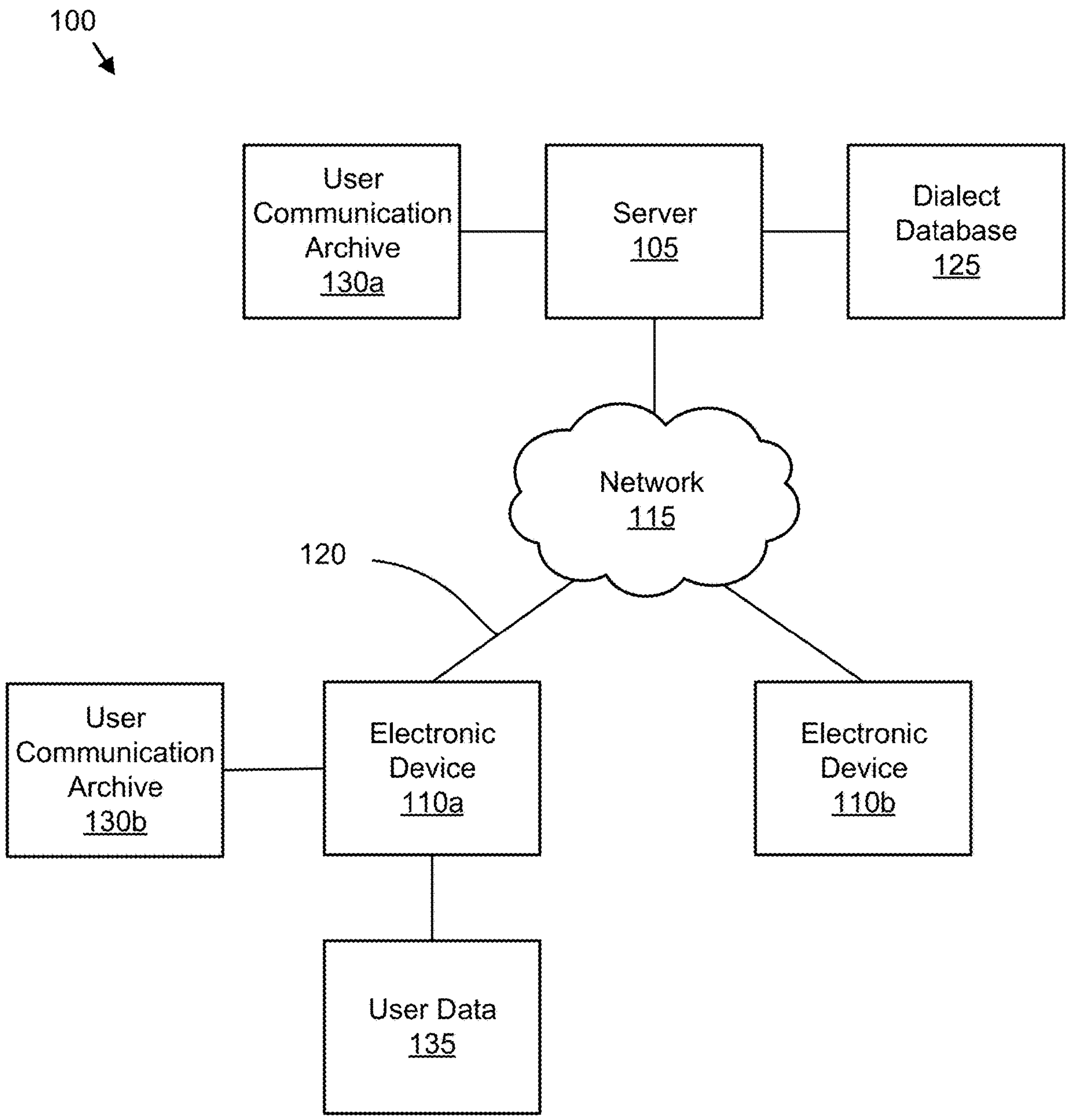
FIG. 1 is a schematic block diagram illustrating one embodiment of a dialect system.

Reference As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real-time. The embodiments may generate and transmit a message based on the data and/or updated data in real-time. The embodiments may securely communicate encrypted data. The embodiments may organize data for efficient validation. In addition, the embodiments may validate the data in response to an action and/or a lack of an action.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a dialect system 100. The system 100 may monitor user communications and present a dialect correction in response to a communication difference. In the depicted embodiment, the system 100 includes one or more electronic devices 110. In addition, the system 100 may include a server 105, a network 115, at least one user communication archive 130, a dialect database 125, and user data.

The network 115 may be the Internet, a mobile telephone network, a wide area network, a local area network, a Wi-Fi network, or combinations thereof.

A user may initiate user communications 120. The user communication 120 may comprise speech, pronunciation, stress, accent, gestures, metaphors, and/or spelling. The user communications 120 may be to a second person in the vicinity of the user and/or to the second person via a second electronic device 110*b*. In one embodiment, the second person is in the vicinity of the user and the first electronic device 110*a* monitors the user communications 120. In another example, the user may communicate from the first electronic device 110*a* to the second person via the second electronic device 110*b*.

The dialect database 125 may identify dialects and/or translate equivalent communications between dialects. The system 100 may identify a user dialect of the user and a second dialect of the second person using the dialect database 125. The dialect database 125 may identify speech, pronunciations, stresses, accents, gestures, metaphors, and/or spellings associated with a given dialect. The dialect database may further identify equivalent speech, pronunciations, stresses, accents, gestures, metaphors, and/or spellings in another dialect.

The user data 135 may include calendar entries, travel plans, videoconference schedules, and the like. The user data 135 may be employed to identify anticipated user communications such as future user communications 120.

The at least one user communication archives 130 may record past user communications 120. The user communication archives 130 may record speech, video, text, and the like.

The user communication 120 may be a mixed dialect event. As used herein, a mixed dialect event comprises communications in the user dialect and the second dialect. The mixed dialect event may be real-time user communications 120 in the user dialect 201 and the second dialect 203. Alternatively, the mixed dialect event may be anticipated user communications in the user dialect and the second dialect.

Although the user and the second person may speak the same language, the user dialect and the second dialect may be different. As a result, the user and the second person may inadvertently miss communicate because of the dialect differences.

The embodiments identify the mixed dialect event for user communications 120 in the user dialect in the second dialect. The embodiments further monitor the user communications 120 and present a dialect correction in response to a communication difference between the user dialect and the second dialect as will be described hereafter. As a result, communications between the user and the second person are more effective and efficient.

Figure 2A:
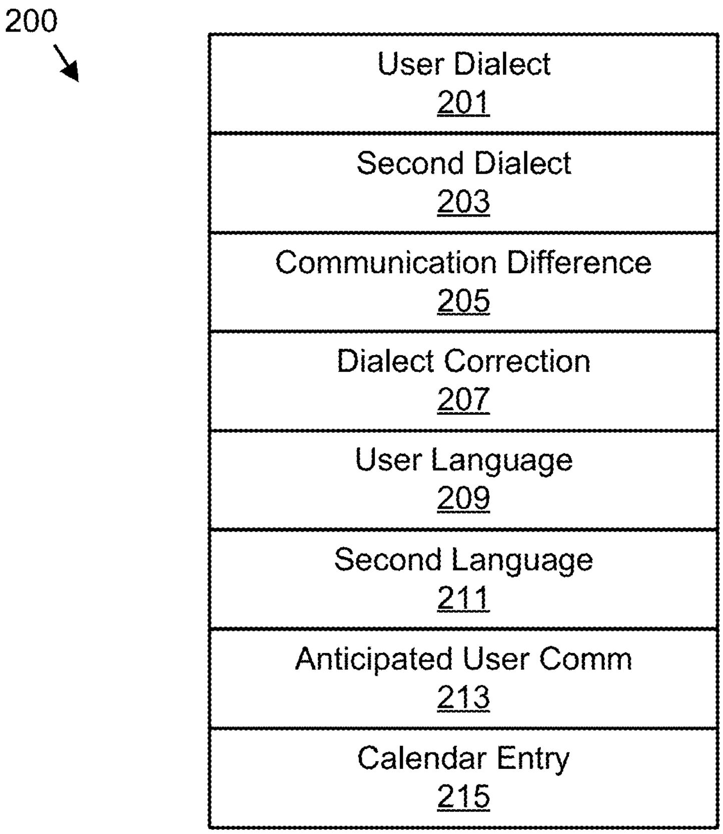
FIG. 2A is a schematic block diagram illustrating one embodiment of a mixed dialect event.

FIG. 2A is a schematic block diagram illustrating one embodiment of a mixed dialect event 200. The mixed dialect event 200 may be used to identify the use of the user dialect 201 and the second dialect 203 in user communications 120. The mixed dialect event 200 may be organized as a data structure in a memory. In the depicted embodiment, the mixed dialect event 200 includes the user dialect 201, the second dialect 203, a communication difference 205, a dialect correction 207, the user language 209, the second language 211, the anticipated user communication 213, and a calendar entry 215.

The user language 209 may identify a language of the user. The user language 209 may be a primary language and/or a secondary language. In one embodiment, the user language 209 comprises a plurality of languages of the user.

The second language 211 may identify the language of the second person. The second language 211 may be a primary language and/or a secondary language. In one embodiment, the second language 211 comprises a plurality of languages of the second person.

The user dialect 201 specifies one or more dialects of the user in each user language 209. Each user dialect 201 may be included in the dialect database 125. The second dialect 203 specifies one or more dialects of the second person in each second language 211. Each second dialect 211 may be included in the dialect database 125.

The communication difference 205 may record a difference in meaning, pronunciation, stress, spelling, and/or accent between the user dialect 201 and the second dialect 203. In one embodiment, the communication difference 205 is determined by identifying the meaning, pronunciation, stress, spelling, and/or accent in one of the user dialect 201 and the second dialect 203, and identifying a corresponding different meaning, pronunciation, stress, spelling, and/or accent in the other of the user dialect 201 and the second dialect 203. The communication difference 205 may be in real-time user communications 120. In addition, the communication difference 205 may be in the anticipated user communications 213.

The dialect correction 207 may be presented to the user and/or the second person to improve communications between the user and the second person. In one embodiment, the dialect correction 207 is a real-time prompt. In addition, the dialect correction 207 may be a proactive training. The proactive training may anticipate and provide a remedy for a communication difference 205.

The anticipated user communication 213 may be a potential and/or future user communication 120 determined from the user data 135. For example, a video conference anticipated user communication 213 may be determined from a calendar entry 215 of a future video conference for the user.

An anticipated communication difference 205 may be determined from the calendar entry 215. For example, the communication difference 205 may be anticipated from a title of the calendar entry 215.

Figure 2B:
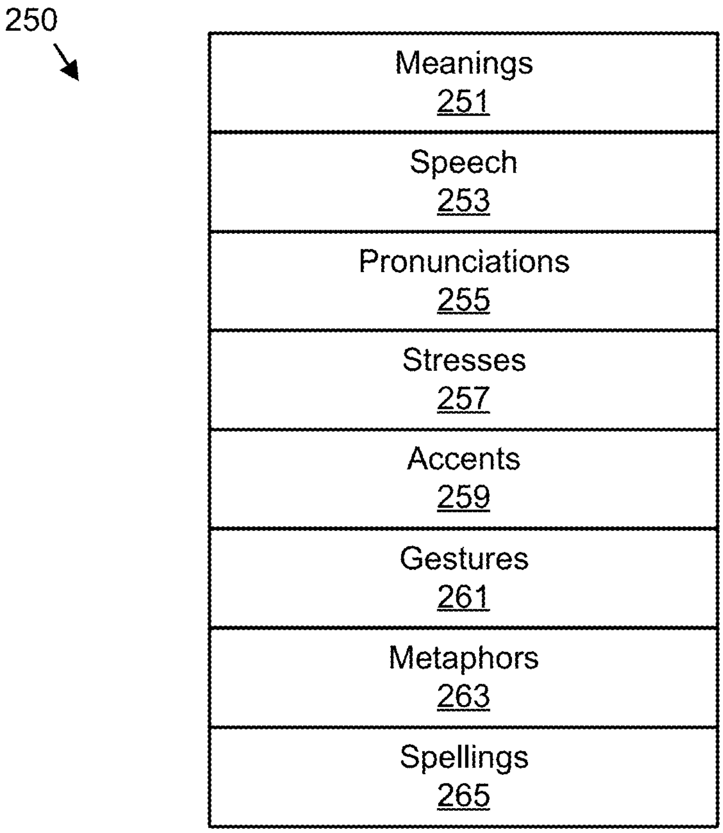
FIG. 2B is a schematic block diagram illustrating one embodiment of a dialect data.

FIG. 2B is a schematic block diagram illustrating one embodiment of a dialect data 250. The dialect data 250 may be organized as a data structure in a memory. There may be dialect data 250 for each dialect of a language. The dialect database 125 may be trained on the dialect data 250. The dialect data 250 may include meanings 251, speech 253, pronunciations 255, stresses 257, accents 259, gestures 261, metaphors 263, and spellings 265 associated with each dialect.

Figure 3:
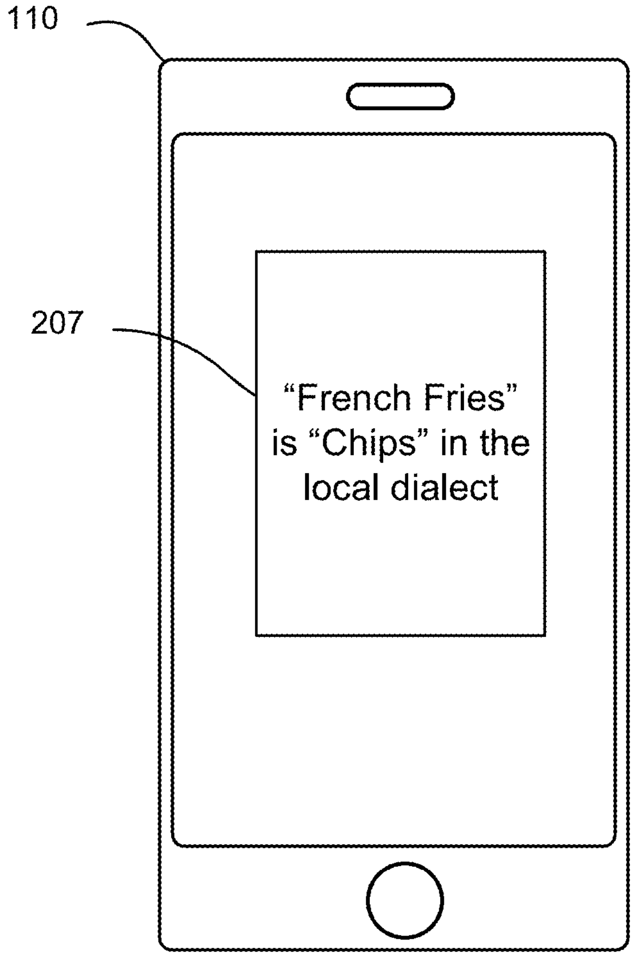
FIG. 3 is a schematic block diagram illustrating one embodiment of a dialect correction.

FIG. 3 is a schematic block diagram illustrating one embodiment of the dialect correction 207. In the depicted embodiment, the dialect correction 207 is displayed on the electronic device 110. The dialect correction 207 may be a real-time prompt. In addition, the dialect correction 207 may be proactive training. The dialect correction 207 may be presented in response to a communication difference 205.

Figure 4:
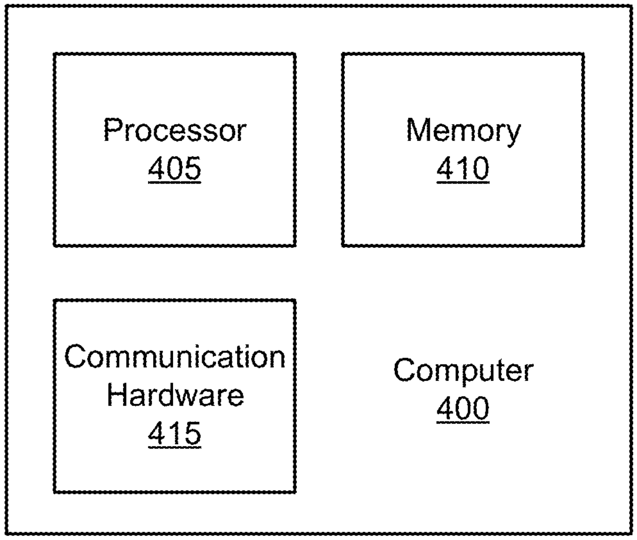
FIG. 4 is a schematic block diagram illustrating one embodiment of a computer.

FIG. 4 is a schematic block diagram illustrating one embodiment of a computer 400. The computer 400 may be embodied in the electronic devices 110 and/or the server 105. In the depicted embodiment, the computer 400 includes a processor 405, a memory 410, and communication hardware 415. The memory 410 may store code and data. The processor 405 may execute the code and process the data. The communication hardware 415 may communicate with other devices.

Figure 5A:
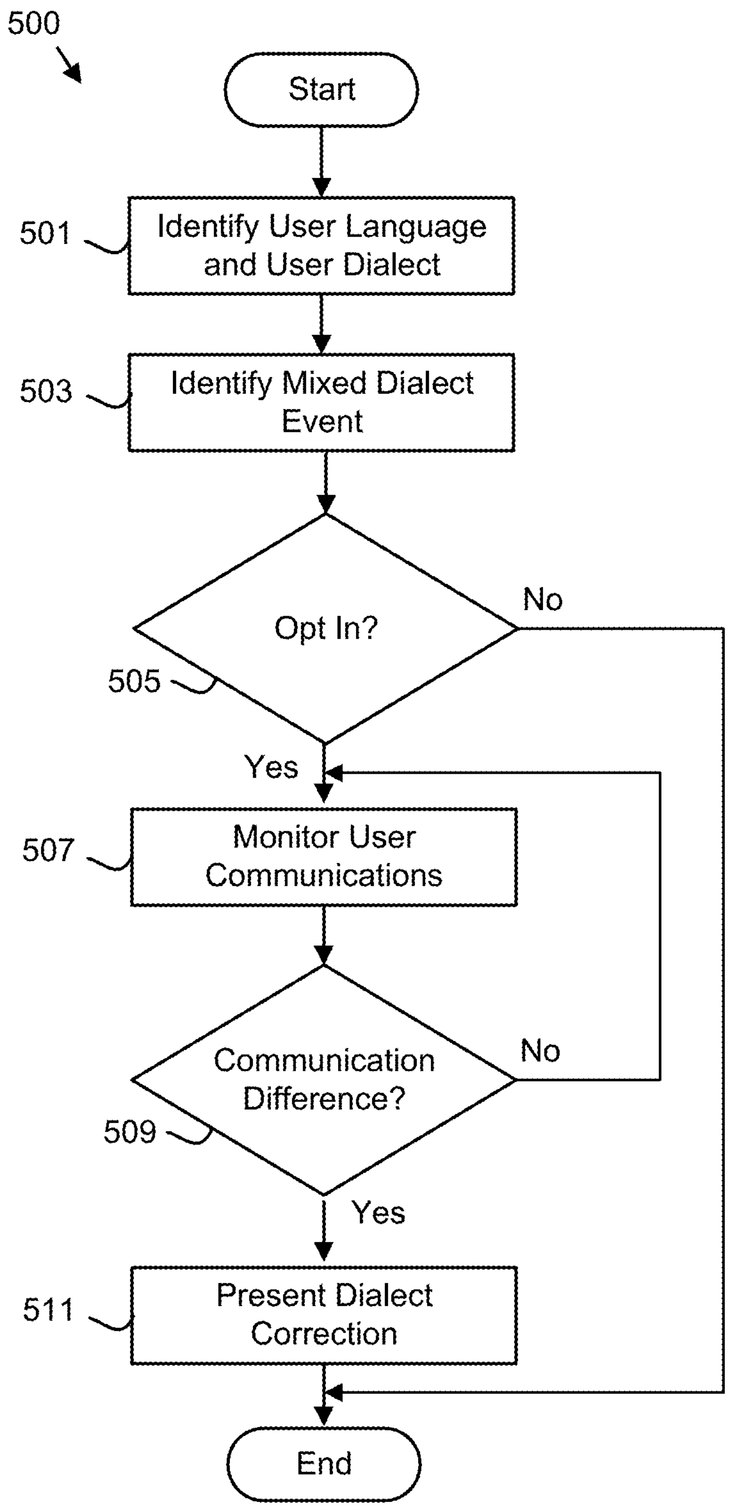
FIG. 5A is a schematic flow chart diagram illustrating one embodiment of a dialect correction method.

FIG. 5A is a schematic flow chart diagram illustrating one embodiment of a dialect correction method 500. The method 500 may present a dialect correction 207 in response to a communication difference 205. The method 500 may be performed by the processor 405.

The method 500 starts, and in one embodiment, the processor 405 identifies 501 the user language 209 and the user dialect 201 of the user of an electronic device 110. In addition, the processor 405 may identify 501 the second language 211 and the second dialect 203 of a second person. The second person may be communicating with the user either directly or via an electronic device 110. In addition, the second person may be an unidentified potential future communicant with the user. For example, the second person may be a hypothetical resident of a travel destination. The dialect database 125 may be referenced to identify the user language 209, the user dialect 201, the second language 211, and/or the second dialect 203.

The processor 405 may identify 503 the mixed dialect event 200. The mixed dialect event 200 may be identified 503 in response to the user dialect 201 and the second dialect 203 being different. In a certain embodiment, the mixed dialect event 200 is identified 503 if the user language 209 and the second language 211 are the same.

In one embodiment, the mixed dialect event 200 is identified from real-time user communications 120 in the user dialect 201 and the second dialect 203. In an alternative embodiment, the mixed dialect event 200 is identified for anticipated user communications 213 in the user dialect 201 and the second dialect 203. For example, the processor 405 may identify 503 anticipated user communications 213 based on a schedule video conference call. The processor 405 may further identify 503 that the user dialect 201 and the second dialect 203 will be employed. As a result, the processor 405 may identify 503 the mixed dialect event 200.

In one embodiment, the processor 405 determines 505 whether the user opts in to monitoring the user communications 120. For example, the processor 405 may present a prompt to the user asking whether to monitor the user communications 120 for communication differences 205 and/or identify communication differences 205.

If the user does not opt in, the method 500 ends. If the user opts in, the processor 405 may monitor 507 the user communications 120. The user communication 120 may include speech, pronunciation, stress, accent, gestures, metaphors, and/or spelling. The processor 405 may monitor 507 user communications 120 with a second person in the vicinity of the user. In addition, the processor 405 may monitor 507 the user communications 120 between electronic devices 110.

The processor 405 may determine 509 whether there are communication differences 205 between the user dialect 201 and the second dialect 203 in the user communications 120. The communication difference 205 may be a difference in meaning, pronunciation, stress, spelling, and/or accent between the user dialect 201 and the second dialect 203. If no communication difference 205 is determined 505, the processor 405 continues to monitor 507 the user communications 120.

In response to determining 509 the communication difference 205 the processor 405 may present 511 the dialect correction 207 and the method 500 ends. The dialect correction 207 may be a real-time prompt presented 511 during the user communication 120. As a result, a user has the opportunity to correct the communication difference 205.

For example, the user may communicate the Spanish word pinche to indicate a small difference consistent with usage in the user dialect 201. However, the processor 405 may determine 509 that pinche indicates a small or lacking idea in the second dialect 203. As a result, the processor 405 may determine 509 the communication difference 205 and present 511 the dialect correction 207 highlighting the difference in the usage of pinche between the user dialect 201 and the second dialect 203.

In an alternative example, the user may communicate the English word “arugula” in a user communication 120. A mixed dialect event 200 may have been previously identified 503 based on a travel plan calendar entry for travel to the United Kingdom (UK) in the user data 135. In addition, the user may have opted in 505 to monitoring user communications 120 and/or presenting dialect corrections 207 for communication differences 205 relating to the travel. As a result, the processor 405 may present 511 the dialect correction 207 indicating that “arugula” is “rocket” in UK dialect English as proactive training in the differences between the user dialect 201 of American English and the second dialect 203 of UK English. Thus, the user is better prepared to communicate with second persons using the second dialect 203.

The embodiments identify the mixed dialect event 200 from user communications 120 in the user dialect 201 and the second dialect 203. As a result, if the communication difference 205 is detected in monitored user communications 120, the embodiments may present the dialect correction 207 to clarify real-time user communications 120 and/or to provide proactive training for anticipated user communications 213. As a result, user communications 120 are made more effective, and the electronic device 110 is made more efficient.

Figure 5B:
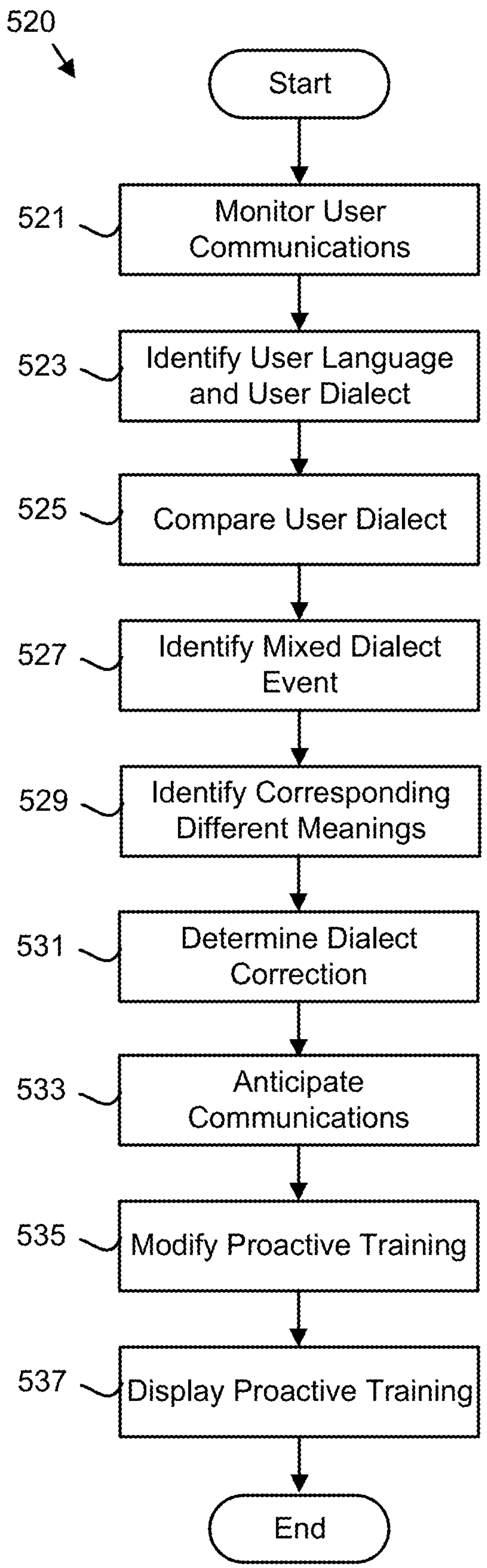
FIG. 5B is a schematic flow chart diagram illustrating one embodiment of a dialect correction method.

FIG. 5B is a schematic flow chart diagram illustrating one embodiment of a dialect correction method 520. The method 520 may display proactive trainings for a mixed dialog event 200. The method 520 may be performed by a computer 400 and/or processor 405.

The method 520 starts and monitors 521 user communications 120 between electronic devices 110. The method 520 identifies 523 a user language 209 and a user dialect 201 from the user communications 120 using the dialect database 125. The dialect database 125 may identify dialects and translate equivalent communications between dialects. The method 520 compares 525 the user dialect 201 to a second dialect 203 using the dialect database 125 in a scheduled communication. The method 520 identifies 527 a mixed dialect event 200 in response to the user dialect 201 and the second dialect 203 being different.

The method 520 identifies 529 a plurality of corresponding different meanings 251, pronunciations 255, stresses 257, spellings 265, and/or accents 259 in the second dialect 203. The method 520 determines 531 a dialect correction 207 using the dialect database 125 in response to the communication difference 205 between the user dialect 201 and the second dialect 203. The dialect correction 207 may comprise a proactive training. The dialect correction 207 highlights the communication differences 205. The method 520 anticipates 533 communications to take place in the user communications 120. The anticipation 533 may be based on a scheduled call such as from a calendar event 215.

The method 520 modifies 535 the proactive training based on the anticipated user communications 213 for modifying the user dialect 201 to the second dialect 203 based on the dialect correction 207. The method 520 may display the proactive training on screens of the electronic devices 110 during the user communications 120 in response to the communication difference 205 between the user dialect 201 and the second dialect 203 and the method 520 ends. The proactive training may display a word and a first meaning in the user dialect 201 and the word and a second meaning in the second dialect 203.

Figure 5C:
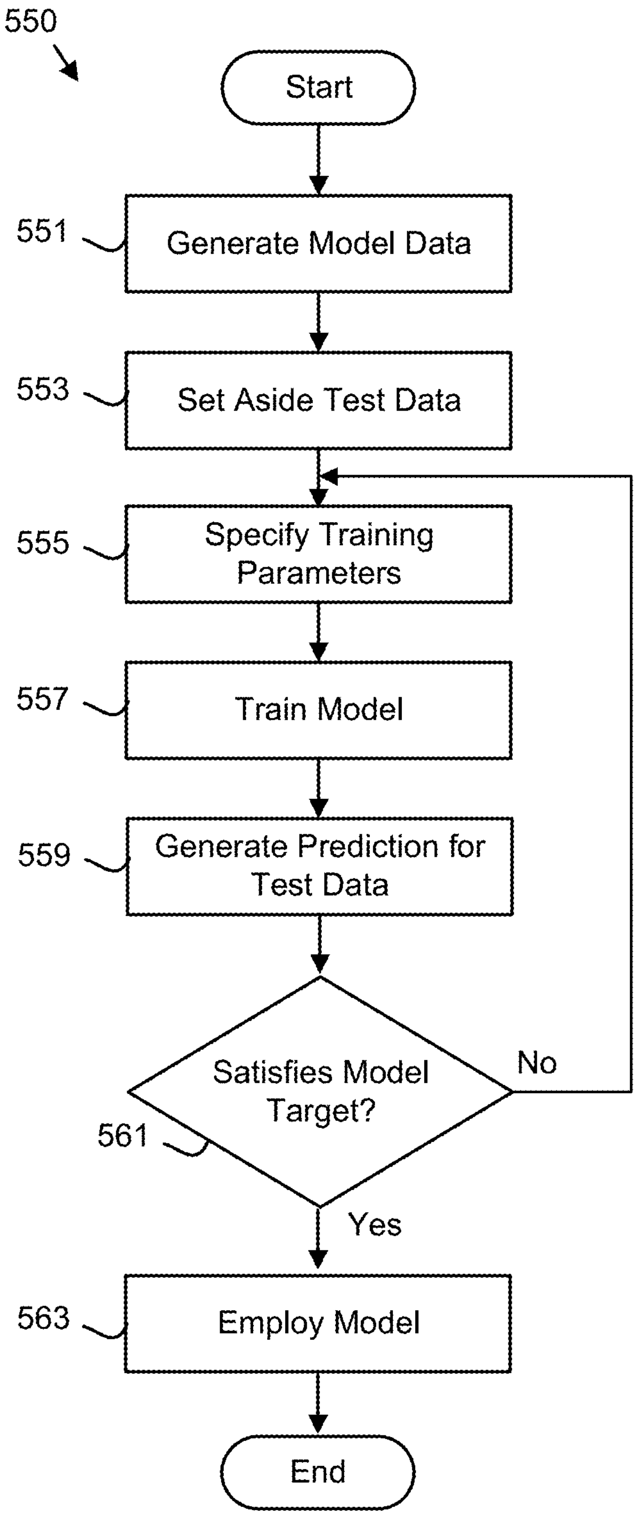
FIG. 5C is a schematic flow chart diagram illustrating one embodiment of a training method.

FIG. 5C is a schematic flow chart diagram illustrating one embodiment of a training method 550. The method 550 trains the dialect database 125. The method 550 may be performed by a computer 400 and/or processor 405.

The method 550 starts and in one embodiment, the method 550 generates 551 a dialect database 125 trained on model training data such as dialect data 250. The dialect database 125 is for a dialect in the user language 209. The dialect database 125 may be trained on model training data comprising at least one of meaning 251, speech 253, pronunciations 255, stresses 257, accents 259, gestures 261, metaphors 263, and/or spellings 265 associated with the dialect. The model training data may be historic data. In one embodiment, real-time model training data is added.

The method 550 may set aside 553 a portion of the model training data as test data. The test data will not be used to train the dialect database 125.

The method 550 may specify 555 the training parameters. The dialect database 125 is trained 557 using the model training data in accordance with the training parameters.

The method 550 generates 559 a prediction from the dialect database 125 with the test data. The prediction may be a proactive training. The method 550 determines 561 whether the prediction satisfies the target dialect database 125. If the prediction does not satisfy the target dialect database 125, the training parameters 275 are modified 555 and the dialect database 125 is again trained 557. If the prediction satisfies the target dialect database 125, the trained dialect database 125 is employed 563 and the method 550 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

training a dialect database on dialects in a user language, wherein the dialect database is trained to identify speech, pronunciations, stresses, accents, gestures, metaphors, and spellings associated with each dialect;

monitoring, by use of a processor, user communications between electronic devices;

identifying a user language and a user dialect from the user communications using the dialect database that identifies dialects and translates equivalent communications between dialects;

comparing the user dialect to a second dialect using the dialect database in a scheduled communication;

identifying a mixed dialect event in response to the user dialect and the second dialect being different;

identifying a plurality of corresponding different meanings, pronunciations, stresses, spellings, and accents in the second dialect;

determining a dialect correction using the dialect database in response to the communication difference between the user dialect and the second dialect, wherein the dialect correction highlights the communication differences, wherein the dialect correction comprises a proactive training;

anticipating communications to take place in the user communications based on a scheduled call;

modifying the proactive training based on the anticipated user communications for modifying the user dialect to the second dialect based on the dialect correction; and displaying the proactive training on screens of the electronic devices during the user communications in response to the communication difference between the user dialect and the second dialect, wherein the proactive training displays a word from the user communication and a first meaning of the word in the user dialect and the word and a second meaning of the word in the second dialect.

2. The method of claim 1, wherein the mixed dialect event is the scheduled call in the user dialect and the second dialect.

3. The method of claim 1, wherein the dialect correction comprises a real-time prompt.

4. The method of claim 1, wherein the mixed dialect event is anticipated user communications in the user dialect and the second dialect identified from user data.

5. The method of claim 1, wherein the proactive training anticipates and provides a remedy for an anticipated communication difference.

6. The method of claim 1, wherein an anticipated communication difference is anticipated from a calendar entry.

7. The method of claim 1, wherein a user opts in to monitoring the user communications.

8. An apparatus comprising:

a processor;

a memory storing code executable by the processor to perform:

training a dialect database on dialects in a user language, wherein the dialect database is trained to identify speech, pronunciations, stresses, accents, gestures, metaphors, and spellings associated with each dialect;

monitoring user communications between electronic devices;

identifying a user language and a user dialect from the user communications using the dialect database that identifies dialects and translates equivalent communications between dialects;

comparing the user dialect to a second dialect using the dialect database in a scheduled communication;

identifying a mixed dialect event in response to the user dialect and the second dialect being different;

identifying a plurality of corresponding different meanings, pronunciations, stresses, spellings, and accents in the second dialect;

determining a dialect correction using the dialect database in response to the communication difference between the user dialect and the second dialect, wherein the dialect correction highlights the communication differences, wherein the dialect correction comprises a proactive training;

anticipating communications to take place in the user communications based on a scheduled call;

modifying the proactive training based on the anticipated user communications for modifying the user dialect to the second dialect based on the dialect correction; and displaying the proactive training on screens of the electronic devices during the user communications in response to the communication difference between the user dialect and the second dialect, wherein the proactive training displays a word from the user communication and a first meaning of the word in the user dialect and the word and a second meaning of the word in the second dialect.

9. The apparatus of claim 8, wherein the mixed dialect event is the scheduled call in the user dialect and the second dialect.

10. The apparatus of claim 8, wherein the dialect correction comprises a real-time prompt.

11. The apparatus of claim 8, wherein the mixed dialect event is anticipated user communications in the user dialect and the second dialect identified from user data.

12. The apparatus of claim 8, wherein the proactive training anticipates and provides a remedy for an anticipated communication difference.

13. The apparatus of claim 8, wherein an anticipated communication difference is anticipated from a calendar entry.

14. The method of claim 8, wherein a user opts in to monitoring the user communications.

15. A program product comprising a non-transitory computer readable storage medium that stores code executable by a processor, the executable code comprising code to:

train a dialect database on dialects in a user language, wherein the dialect database is trained to identify speech, pronunciations, stresses, accents, gestures, metaphors, and spellings associated with each dialect;

monitoring user communications between electronic devices;

identify a user language and a user dialect from the user communications using the dialect database that identifies dialects and translates equivalent communications between dialects;

comparing the user dialect to a second dialect using the dialect database in a scheduled communication;

identify a mixed dialect event in response to the user dialect and the second dialect being different;

identify a plurality of corresponding different meanings, pronunciations, stresses, spellings, and accents in the second dialect;

determine a dialect correction using the dialect database in response to the communication difference between the user dialect and the second dialect, wherein the dialect correction highlights the communication differences, wherein the dialect correction comprises a proactive training;

anticipate communications to take place in the user communications based on a scheduled call;

modify the proactive training based on the anticipated user communications for modifying the user dialect to the second dialect based on the dialect correction; and display the proactive training on screens of the electronic devices during the user communications in response to the communication difference between the user dialect and the second dialect, wherein the proactive training displays a word from the user communication and a first meaning of the word in the user dialect and the word and a second meaning of the word in the second dialect.

16. The program product of claim 15, wherein the mixed dialect event is the scheduled call in the user dialect and the second dialect.

17. The program product of claim 15, wherein the dialect correction comprises a real-time prompt.

18. The program product of claim 15, wherein the mixed dialect event is anticipated user communications in the user dialect and the second dialect identified from user data.

19. The program product of claim 15, wherein the proactive training anticipates and provides a remedy for an anticipated communication difference.

20. The program product of claim 15, wherein an anticipated communication difference is anticipated from a calendar entry.

* * * * *